(12) United States Patent
Kumar et al.

(10) Patent No.: US 12,554,909 B2
(45) Date of Patent: Feb. 17, 2026

(54) METHOD AND SYSTEM FOR BUILDING DIGITAL TWIN BY LEVERAGING PRIOR KNOWLEDGE

(71) Applicant: Tata Consultancy Services Limited, Mumbai (IN)

(72) Inventors: Rajan Kumar, Pune (IN); Vivek Kumar, Noida (IN); Venkataramana Runkana, Pune (IN)

(73) Assignee: Tata Consultancy Services Limited, Mumbai (IN)

(*) Notice: Subject to any disclaimer, the term of this patent is extended or adjusted under 35 U.S.C. 154(b) by 1051 days.

(21) Appl. No.: 17/650,046

(22) Filed: Feb. 4, 2022

(65) Prior Publication Data

US 2022/0284157 A1 Sep. 8, 2022

(30) Foreign Application Priority Data

Feb. 5, 2021 (IN) .............................. 202121005105

(51) Int. Cl.
  *G06F 30/27* (2020.01)
  *G06N 3/08* (2023.01)
  *G06F 111/20* (2020.01)

(52) U.S. Cl.
  CPC ............... *G06F 30/27* (2020.01); *G06N 3/08* (2013.01); *G06F 2111/20* (2020.01)

(58) Field of Classification Search
  None
  See application file for complete search history.

(56) References Cited

U.S. PATENT DOCUMENTS

| 9,715,660 | B2 | 7/2017 | Parada San Martin et al. |
| 2015/0235143 | A1 | 8/2015 | Eder |
| 2019/0236489 | A1* | 8/2019 | Koudal ................. G06N 20/00 |
| 2019/0354922 | A1* | 11/2019 | Berti .................... G06K 7/1417 |

FOREIGN PATENT DOCUMENTS

| CN | 111274652 A | * | 6/2020 | ............. G06F 30/15 |
| WO | WO-2020190272 A1 | * | 9/2020 | ............. G06N 3/047 |

OTHER PUBLICATIONS

H. Tercan, A. Guajardo and T. Meisen, "Industrial Transfer Learning: Boosting Machine Learning in Production," 2019 IEEE 17th International Conference on Industrial Informatics (INDIN), Helsinki, Finland, 2019, pp. 274-279, doi: 10.1109/ INDIN41052.2019. 8972099. (Year: 2019).*

* cited by examiner

*Primary Examiner* — Rehana Perveen
(74) *Attorney, Agent, or Firm* — Finnegan, Henderson, Farabow, Garrett & Dunner, LLP (57) ABSTRACT

In traditional systems, every time a digital twin of a component needs to be generated, behavioral as well as operational data specific to the component needs to be fetched, which has practical difficulties owing to complex nature of processes/equipment the component is associated with. The disclosure herein generally relates to building digital twins, and, more particularly, to a method and system for building digital twin by leveraging existing knowledge. The system determines extent of similarity between two components, and based on the determined extent of similarity, uses different approaches to retrain a ANN data-driven model to obtain a desired accuracy for features of the component for which the digital twin is being generated.

6 Claims, 5 Drawing Sheets

METHOD AND SYSTEM FOR BUILDING DIGITAL TWIN BY LEVERAGING PRIOR KNOWLEDGE

PRIORITY CLAIM

This U.S. patent application claims priority under 35 U.S.C. § 119 to: Indian Patent Application No. 202121005105, filed on Feb. 5, 2021. The entire contents of the aforementioned application are incorporated herein by reference.

TECHNICAL FIELD

The disclosure herein generally relates to building digital twins, and, more particularly, to a method and system for building digital twins by leveraging prior knowledge.

BACKGROUND

Typically, industrial equipment (referred to as 'equipment' hereafter) are complex in nature, and there are challenges in monitoring working of the equipment for performance assessment. For example, the equipment may be a high temperature furnace, and for performance assessment, temperatures inside the furnace may have to be measured. However, due to very high temperatures inside the furnace, use of sensors to measure the temperatures may not be feasible. This problem may be solved by using a digital twin of the equipment.

Digital twins are cyber-physical systems which replicate the actual plant behavior in a virtual environment. From the industrial application point of view, digital twins of individual equipment or asset, unit operation or the entire manufacturing plant can be developed and deployed for monitoring, simulation, analysis, optimization and control purposes that can result in improved performance in terms of plant productivity, product quality, emissions, maintenance, safety of personnel, etc. The digital twin captures behavioral as well as operational knowledge and characteristics of the equipment or the unit operation or the entire plant. This allows a user to simulate working of the equipment and analyze performance of the equipment and in turn take decisions on specific changes to be made to improve performance of the equipment to a desired level using optimization and related techniques. The current process of digital twin development consists collection of relevant data using various sensors and laboratory analysis, verification of data quality, pre-processing of data, exploratory data analysis, identification of key parameters that influence the plant performance, predictive model development, soft sensor development and optimization. Although the generic methodology of developing a digital twin is fairly common, development and deployment of digital twins varies from industry to industry as it requires knowledge specific to that particular industrial application. Naturally, this requires considerable amount of effort, time, and knowledge.

In an enterprise, which may consist of multiple plants, units and equipment, once the digital twin is developed for a particular plant/unit/equipment, it would be of value to develop digital twin for another similar plant/unit/equipment to reap the benefits of deploying a digital twin. Developing a digital twin for a new plant ab initio will again require a similar time and effort as the original development. Secondly, the new plant/unit/equipment may not have enough good quality data, which makes the development of digital twin for the new unit difficult. To generate a digital twin, the behavioral as well as operational knowledge specific to the equipment need to be captured. However, capturing the behavioral and operational knowledge for each equipment is a cumbersome process. However, there may be similarities between different equipment from the same plant or between equipment in different plants. Similar arguments hold good for the complete manufacturing plant as well. State of the art systems do not consider the similarities between different equipment or process or the manufacturing plant itself and fail to take this similarity to advantage while generating the digital twins.

SUMMARY

Embodiments of the present disclosure present technological improvements as solutions to one or more of the above-mentioned technical problems recognized by the inventors in conventional systems. For example, in one embodiment, a processor implemented method of building digital twin for a first component of a first industrial plant is provided. In this method, an extent of similarity between the first component and a second component is determined initially, via one or more hardware processors, wherein the second component is a component having a similar operation as that of the first industrial plant. Further, the first component is determined as belonging to one of a first category, a second category, a third category, and a fourth category, based on the extent of similarity and amount of data associated with the first component, via the one or more hardware processors. Further, each of a plurality of parameters of the first component is mapped with corresponding parameter of the second component, via the one or more hardware processors. Further, data integration is performed for the first component, by using a data integration process used for the second component, via the one or more hardware processors. Then a feature selection is performed for the first component, via the one or more hardware processors. Further, accuracy of a data-driven model of the first component is determined, and if the determined accuracy is below a threshold of accuracy, then the data-driven model is retrained to generate a predictive data-driven model, using the following steps. A last hidden layer of a plurality of hidden layers of the Artificial Neural Network (ANN) data-driven model is trained, if the first component belongs to the first category. If the first component belongs to the second category, then a sub-set comprising more than one of the hidden layers from the plurality of hidden layers is trained, starting from the last hidden layer towards the first hidden layer, recursively till the measured accuracy is at least equal to the threshold of accuracy. If the first component belongs to the third category, then a subset of the plurality of hidden layers starting from the first hidden layer towards the last hidden layer is trained, recursively till the measured accuracy is at least equal to the threshold of accuracy. If the first component belongs to the fourth category, then all of the plurality of hidden layers of the ANN data-driven model are trained. The generated predictive data-driven model is then used to emulate working of the first component, via the one or more hardware processors.

In another aspect, a system for building digital twin for a first component of a first industrial plant is provided. The system includes a memory storing instructions, one or more communication interfaces, and one or more hardware processors coupled to the memory via the one or more communication interfaces. The one or more hardware processors are configured by the instructions to initially determine an extent of similarity between the first component and a second component, wherein the second component is a component having a similar operation as that of the first component and vice versa. Further, the first component is determined as belonging to one of a first category, a second category, a third category, and a fourth category, based on the extent of similarity and amount of data associated with the first component, via the one or more hardware processors. Further, each of a plurality of parameters of the first component is mapped with corresponding parameter of the second component, via the one or more hardware processors. Further, data integration is performed for the first component, by using a data integration process used for the second component, via the one or more hardware processors. Then a feature selection is performed for the first component, via the one or more hardware processors. Further, accuracy of a data-driven model of the first component is determined, and if the determined accuracy is below a threshold of accuracy, then the data-driven model is retrained to generate a predictive data-driven model, using the following steps. A last hidden layer of a plurality of hidden layers of the Artificial Neural Network (ANN) data-driven model is trained, if the first component belongs to the first category. If the first component belongs to the second category, then a sub-set comprising more than one of the hidden layers from the plurality of hidden layers is trained, starting from the last hidden layer towards the first hidden layer, recursively till the measured accuracy is at least equal to the threshold of accuracy. If the first component belongs to the third category, then a sub-set of the plurality of hidden layers starting from the first hidden layer towards a last hidden layer is trained, recursively till the measured accuracy is at least equal to the threshold of accuracy. If the first component belongs to the fourth category, then all of the plurality of hidden layers of the ANN data-driven model are trained. The generated predictive data-driven model is then used by the system to emulate working of the first component.

In yet another aspect, a non-transitory computer readable medium for building digital twin for a first component of a first industrial plant is provided. In this method, an extent of similarity between the first component and a second component is determined initially, via one or more hardware processors, wherein the second component is a component having a similar operation as that of the first industrial plant. Further, the first component is determined as belonging to one of a first category, a second category, a third category, and a fourth category, based on the extent of similarity and amount of data associated with the first component, via the one or more hardware processors. Further, each of a plurality of parameters of the first component is mapped with corresponding parameter of the second component, via the one or more hardware processors. Further, data integration is performed for the first component, by using a data integration process used for the second component, via the one or more hardware processors. Then a feature selection is performed for the first component, via the one or more hardware processors. Further, accuracy of a data driven model of the first component is determined, and if the determined accuracy is below a threshold of accuracy, then the data driven model is retrained to generate a predictive data driven model, using the following steps. A last hidden layer of a plurality of hidden layers of the Artificial Neural Network (ANN) data-driven model is trained, if the first component belongs to the first category. If the first component belongs to the second category, then a sub-set comprising more than one of the hidden layers from the plurality of hidden layers is trained, starting from the last hidden layer towards a first hidden layer, recursively till the measured accuracy is at least equal to the threshold of accuracy. If the first component belongs to the third category, then a subset of the plurality of hidden layers starting from the first hidden layer towards a last hidden layer is trained, recursively till the measured accuracy is at least equal to the threshold of accuracy. If the first component belongs to the fourth category, then all of the plurality of hidden layers of the ANN data-driven model are trained. The generated predictive data-driven model is then used to emulate working of the first component, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

In order to develop a digital twin for an enterprise, component level digital twins are required. They can be classified as: process twins, equipment twins and plant twins.

Process twin: Industrial scale manufacturing of products involves multiples steps or processes. For example, in a coke making plant, the processes may include blending and crushing of coal, transportation and charging of coal to the coke oven, coking in the coke oven, quenching hot coke, screening, by-product recovery etc. The main goal of coke plant operators is to continuously operate the plant with better control and optimum efficiency. A process twin usually replicates the behavior of the physical process in all aspects, especially related to the transformation of raw materials into final products, by-products, and solid wastes/liquid effluents/gaseous emissions. The key performance indicators that are of importance in case of a process twin are throughput, productivity, product quality, process abnormalities, emissions of toxic chemicals, quantity or rate of generation of wastes, usage of resources or raw materials, fuel or energy consumption, etc.

Equipment twin: An equipment or asset twin usually captures the aspects related to condition and health of a physical asset or equipment and associated performance metrics. For example, a coke making plant might use charging cars, pusher machines, coal stamping machines, coke transfer machines, quenching locomotives, coke oven etc. to perform various processes. The key performance indices in this case are frequency of failures, mean time between failures, time to repair, cost of repair, cost of maintenance of the equipment, impact of failure of a component in an equipment or the whole equipment itself on the downstream equipment and processes and on the whole manufacturing plant.

Plant/unit Twin: A plant or a unit is a combination of processes and equipment. For example, a coke plant may consists of various manufacturing processes like coal blending and crushing, feeding to coke oven, coking in oven, quenching hot coke, screening, by-product recovery etc. and equipment like charging cars, pusher machines, coal stamping machines, coke transfer machines, quenching locomotives, coke oven, etc. Hence, development of plant/unit twin requires further combination of each component to make it work as a single unified digital twin so that all the constitutive individual digital twins can interact with each in a seamless manner.

Development of a digital twin requires not only substantial time and effort but also significant amount of knowledge of the process or the equipment or the plant. If a digital twin has been developed and deployed successfully for an industrial system, it would be of value to utilize the same while developing digital twins of similar industrial systems in future. For example, distillation of petroleum crude is similar in nature in refineries. Condition and health characteristics of equipment like pumps, compressors and turbines will also be similar across industries. Similarly, manufacturing of products such as steel involves similar processes and equipment across iron and steel industries. However, there exists no method and system currently that utilizes prior knowledge. Another important challenge is to build digital twins for greenfield plants as appropriate data is not available for newly built plants. In such a case, leveraging the data and knowledge from digital twins of similar processes and equipment will be a viable option to start the development of digital twins and then enhance their performance as new data gets generated. It should be noted here that the data referred here may represent anyone or all of data related to properties or characteristics of raw materials processed, characteristics of products and by-products, characteristics of wastes/effluents/emissions, properties of materials of construction of the equipment, real-time data from physical sensors or instruments, real-time data from unobtrusive or wireless sensors, data related to environmental conditions, etc. The embodiments disclosed herein facilitates leveraging data of one process and corresponding existing digital twin, to build digital twin for another process. The method and system disclosed herein can be used to generate the digital twin for one process/equipment/plant/unit using an existing digital twin of another process/equipment/plant/unit, respectively. Details of the system and method described herein are disclosed in the foregoing description.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

Figure 1:
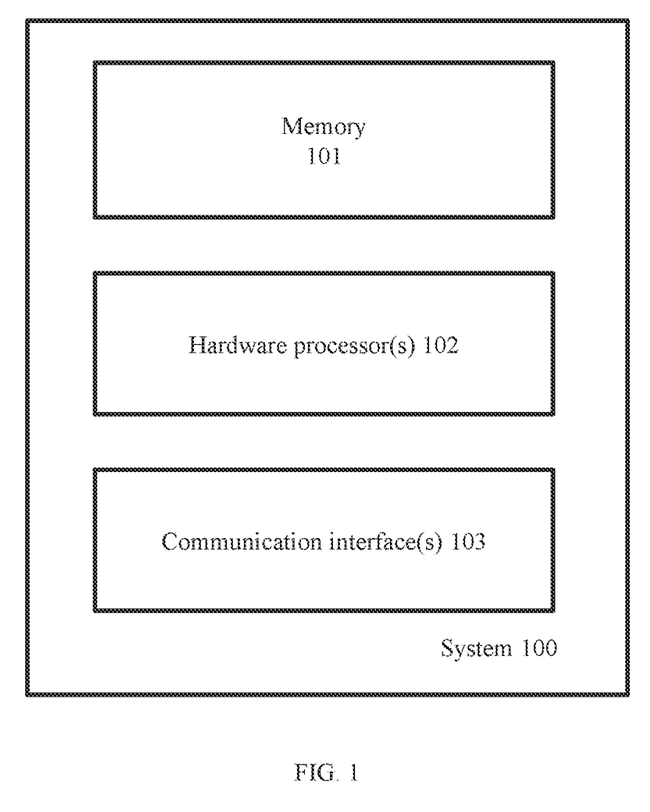
FIG. 1 illustrates an exemplary system for generating a digital twin according to some embodiments of the present disclosure.

The system 100 includes one or more hardware processors 102, communication interface(s) or input/output (I/O) interface(s) 103, and one or more data storage devices or memory 101 operatively coupled to the one or more hardware processors 102. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

The memory 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more components (not shown) of the system 100 can be stored in the memory 101. The memory 101 is configured to store a plurality of operational instructions (or 'instructions') which when executed cause one or more of the hardware processor(s) 102 to perform various actions associated with the process of generating digital twin, being performed by the system 100. The system 100 can be implemented in a variety of ways as per requirements. Functions of various components of the system 100 are explained with description of FIGS. 2 through 4.

Figure 2A:
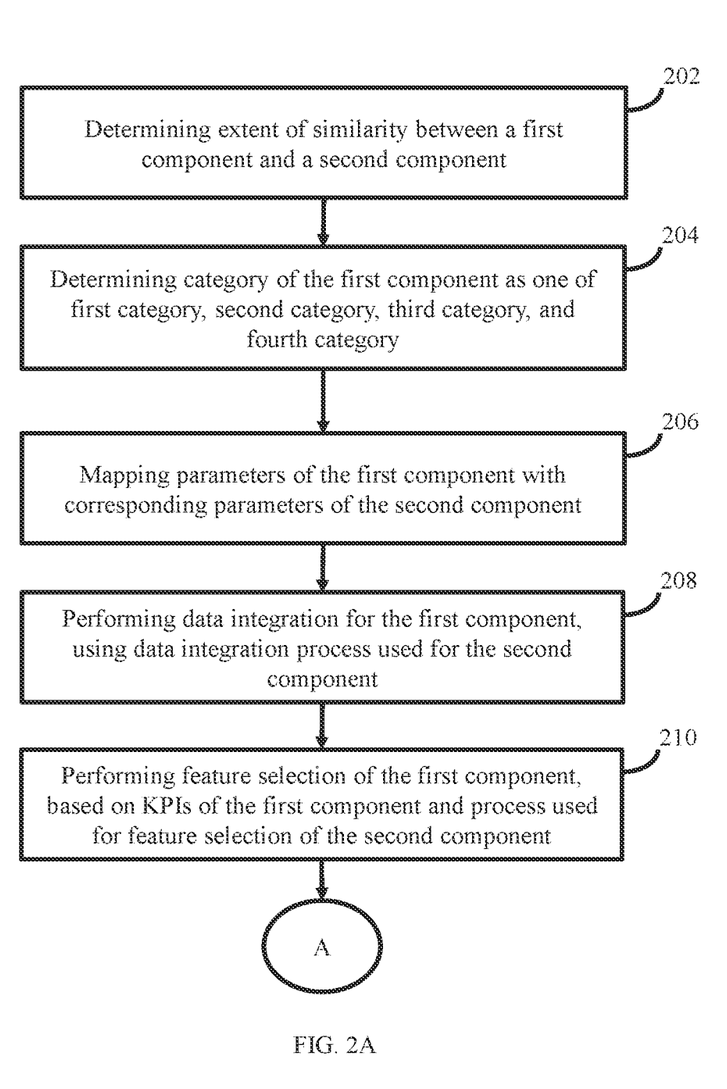
FIGS. 2A and 2B (collectively referred to as FIG. 2) is a flow diagram depicting steps involved in the process of generating the digital twin, using the system of FIG. 1, according to some embodiments of the present disclosure.
Figure 2B:
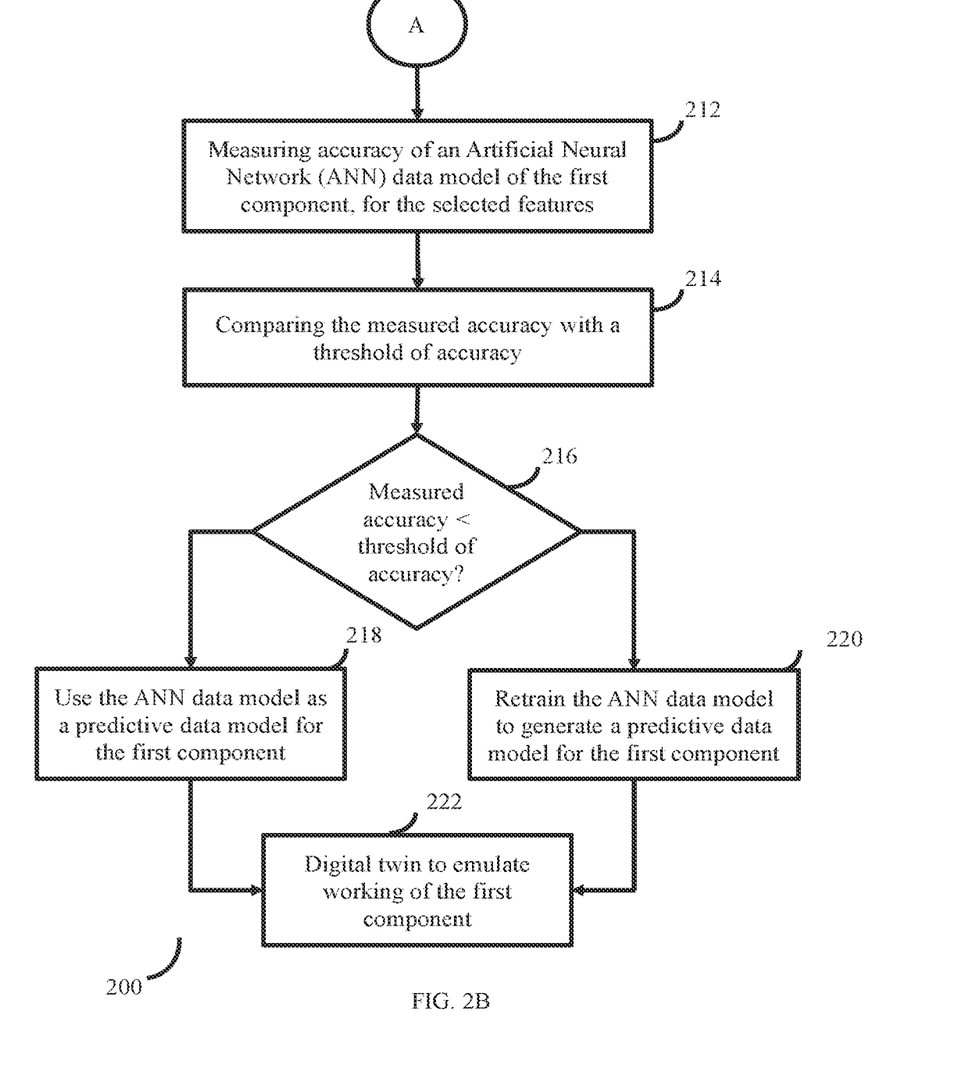

FIGS. 2A and 2B (collectively referred to as FIG. 2) is a flow diagram depicting steps involved in the process of generating the digital twin, using the system of FIG. 1, according to some embodiments of the present disclosure.

Consider that the system 100 needs to generate a digital twin for a component, which is termed as 'first component', and is represented as 1'. Also, there is a component, which is termed as 'second component', and is represented as 1. The representations '1'' 'first component', and 'component 1'' are used interchangeably throughout the description. Similarly, the representations 'second component', and 'component 1' are used interchangeably throughout the description. The second component already has a digital twin. It is to be noted that in the context of the digital twin generation disclosed herein, the term 'component' may be any of a process, equipment, or plant. The system 100 executes the steps in method 200 to generate an ANN data-driven model for the first component, by leveraging knowledge from the second component and the corresponding digital twin. The ANN data model is designed to emulate decision making done by human brains. Structure of the ANN data model is such that it includes a plurality of layers (also referred to as "hidden layers"), which when trained, generates decisions based on input data fed to the ANN data model. In the digital twin generation scenario being addressed by the system 100, extent of similarity between any two different components being considered at any instance may vary, and in turn the amount of data that can be reused for training also varies. So only selected layers are trained using the training approach depicted in FIG. 3. It is to be noted that the terms 'data driven' and 'data-driven' are used interchangeably. In another embodiment, the system 100 can be used to generate non-ANN data-driven models as well, if required, by using any suitable approach.

At step 202, the system 100 determines an extent of similarity between the first component and the second component, by comparing data such as but not limited to type of component, type of operation within the component, number of sensors, location of sensors, and statistics of sensors located at same or similar locations, for the first component and for the second component. The system 100 may be configured to consider the digital twin of the second component to generate the digital twin of the first component if the determined extent of similarity is at least equal to a threshold of similarity. Value of the threshold of similarity may be pre-configured within the system. A higher value of the extent of similarity may indicate that the first component and the second component are similar to each other, and in turn may indicate that digital twins of the first component and the second component may be similar. For example, first component and second component could be coking of coal in two different coke ovens. Further, a coking technology used in the first coke oven and the second coke oven could be by-product recovery or/and heat recovery process. Further, the by-product coke oven processes could vary on coke oven design, OEM, raw materials, weather condition, oven age etc. Further, depending upon coke ovens commissioning date, OEM, advancement in measurement & control system and various other reasons, first component and second component of by-product coke oven process could have same/different numbers of sensors installed in it. Furthermore, the sensors could measure same property of coke oven, however it could be located relatively at different positions. For example, location of sensor to measure coke oven wall temperatures for first component could be at 1 m from the top, while for second component, it could be at 2 m from the top. Similarly, a lower value of the extent of similarity may indicate that the first component and the second component are dissimilar to each other, and in turn may indicate that digital twins of the first component and the second component may be dissimilar.

After determining that the extent of similarity of the second component is at least equal to the threshold of similarity, at step 204, the system 100 determines a category of the first component as one of a first category, a second category, a third category, and a fourth category. In an embodiment, the system determines the category of the first component based on comparison of the first equipment with the second equipment.

Figure 3:
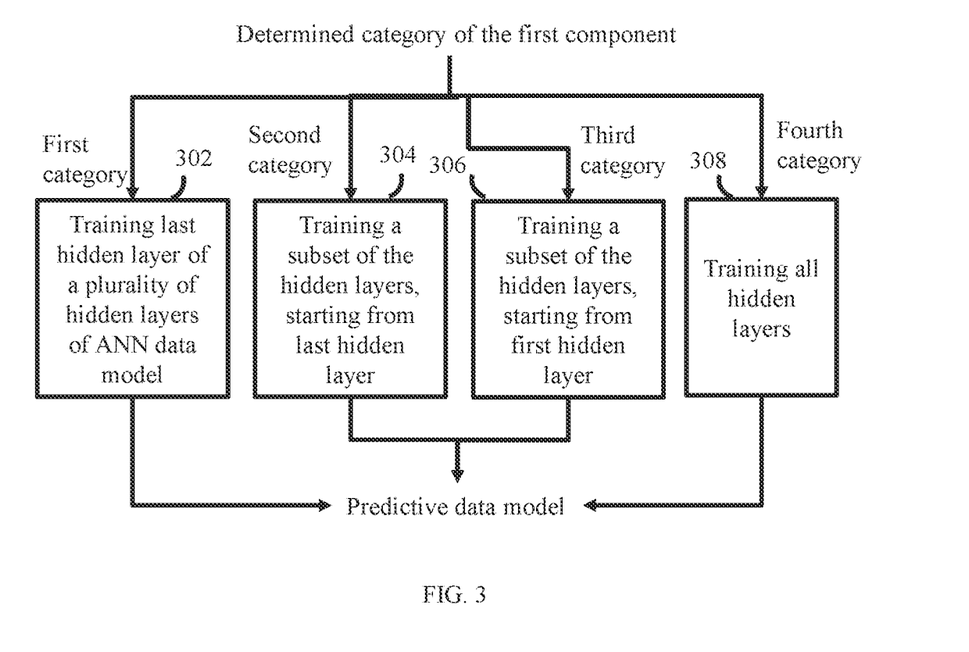
FIG. 3 is a flow diagram depicting steps involved in the process of training an Artificial Neural Network (ANN) data driven model to generate a predictive data driven model, using the system of FIG. 1, according to some embodiments of the present disclosure.
Figure 4:
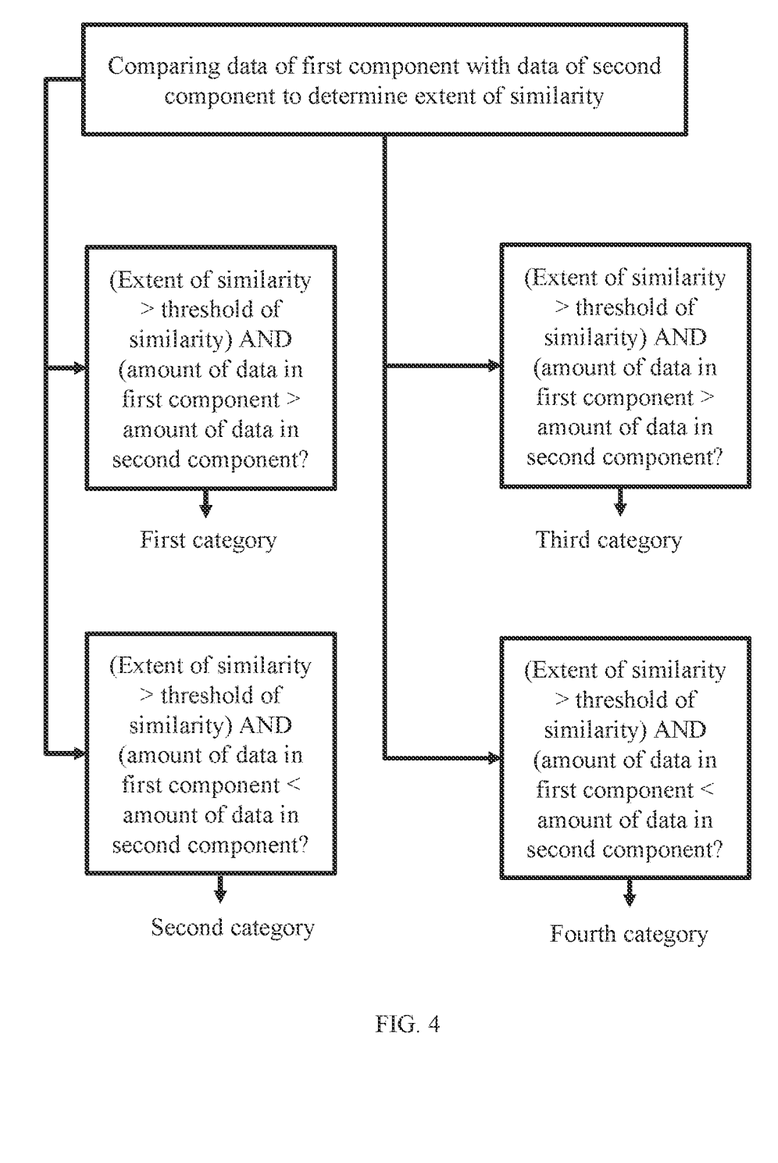
FIG. 4 is a flow diagram depicting steps involved in the process of categorizing the first component for which the digital twin is being generated, using the system of FIG. 1, according to some embodiments of the present disclosure.

If component 1' data is small and similar to component 1, and if component 1' has less amount of data as compared to component 1, then the system 100 categorizes the first component as belonging to the first category. Component 1' data being similar to component 1 data may indicate that number of features or sensor measurement are same for the first component and the second component. For example, component 1' and component 1 are coke plants. Digital twin for component 1 may comprise of sensor measurement like coal blending (type of coal, % of coal, coal composition), coal quality, process parameters (charging and pushing information, stamping time, bulk density, coking and soaking time, time to reach peak temperature, oven wall temperature, oxygen percentage), quenching data (quantity water used and quenching time), by-product quality and amount, coke quality produced. For component 1' sensor measurements available are coal blending (type of coal, % of coal, coal composition), coal quality, process parameters (charging and pushing information, stamping time, bulk density, coking and soaking time, time to reach peak temperature, oven wall temperature, oxygen percentage), quenching data (quantity water used and quenching time), by-product quality and amount, coke quality produced. Here, component 1 and component 1' data are similar. Furthermore, digital twin for component 1 may be built on 5 years of data however component 1' may be having only 1 year of data. This is depicted in FIG. 3.

If component 1' data is large in comparison with data of component 1, and the data is similar, the system 100 categorizes the first component as belonging to a second category. In this case also, number of features or sensors measurements are same for both components. For example, component 1' and component 1 are coke plants. Digital twin for component 1 may comprise of sensor measurement like coal blending (type of coal, % of coal, coal composition), coal quality, process parameters (charging and pushing information, stamping time, bulk density, coking and soaking time, time to reach peak temperature, oven wall temperature, oxygen percentage), quenching data (quantity water used and quenching time), by-product quality and amount, coke quality produced. For component 1' sensor measurements available are coal blending (type of coal, % of coal, coal composition), coal quality, process parameters (charging and pushing information, stamping time, bulk density, coking and soaking time, time to reach peak temperature, oven wall temperature, oxygen percentage), quenching data (quantity water used and quenching time), by-product quality and amount, coke quality produced. Here, component 1 and component 1' data are similar. Furthermore, digital twin for component 1 is built on 1 year of data however component 1' has 5 year of data. This is depicted in FIG. 3.

If component 1' data is small in comparison with data of component 1, and is different from the data of component 1, the system 100 categorizes the first component as belonging to a third category. In this case, number of features or sensor measurement are different for the first component and the second component. And, component 1' has a smaller set of data as compared to component 1. For example, component 1' and component 1 are coke plants. Digital twin for component 1 may comprise of sensor measurement like coal quality, process parameters (charging and pushing information, stamping time, bulk density, coking and soaking time, time to reach peak temperature, oxygen percentage), quenching data (quantity water used and quenching time), by-product quality and amount, coke quality produced. For component 1' sensor measurements available are coal blending (type of coal, % of coal, coal composition), coal quality, process parameters (charging and pushing information, stamping time, bulk density, coking and soaking time, time to reach peak temperature, oven wall temperature, oxygen percentage), quenching data (quantity water used and quenching time), by-product quality and amount, coke quality produced. Here, component 1' has more sensor measurements available than component 1. Furthermore, digital twin for component 1 is built on 5 years of data however component 1' has only 1 year of data. This is also depicted in FIG. 3.

If component 1' data is large and different from component 1, then number of features or sensor measurements is different for both the first component and the second component. For example, component 1' and component 1 are coke plants. Digital twin for component 1 may comprise of sensor measurement like coal quality, process parameters (charging and pushing information, stamping time, bulk density, coking and soaking time, time to reach peak temperature, oxygen percentage), quenching data (quantity water used and quenching time), by-product quality and amount, coke quality produced. For component 1' sensor measurements available are coal blending (type of coal, % of coal, coal composition), coal quality, process parameters (charging and pushing information, stamping time, bulk density, coking and soaking time, time to reach peak temperature, oven wall temperature, oxygen percentage), quenching data (quantity water used and quenching time), by-product quality and amount, coke quality produced. Here, component 1' has more sensor measurements available than component 1. Furthermore, digital twin for component 1 is built on 1 year of data however component 1' has 5 years of data. In this case the system categorizes the component as belonging to a fourth category. This is again depicted in FIG. 3.

After determining the category of the first component, at step 206, the system 100 maps parameters of the first component with parameters of the second component. Upon categorization of new component on which it falls, it is required to map and tag parameters of component 1 and 1'. In an embodiment, the system 100 uses a combination of domain knowledge and machine learning to perform the mapping of parameters. Some parameters of component 1' can directly be mapped as their names could be same as that of component 1. In some scenarios, even if the names are different, some parameters may be representative of particular functioning of the component, and this may be identified by the system 100, using domain knowledge that may be present in the repository of the system 100. In another embodiment, in addition to the domain knowledge data, the system 100 may use statistics and machine learning to process information on the parameters to understand their range of operation, nature, effect on the process, and so on.

Further, at step 208, the system 100 performs data integration for the first component, using a data integration approach used for data integration of the second component, due to the similarity between the first component and the second component. At step 210, the system 100 performs feature selection for the first component. The system 100 performs the feature selection by considering various Key Performance Indicators (KPIs) and uses a feature selection mechanism used for feature selection of the second component. In an embodiment, the system 100 may consider similarity of the first component with the second component while performing the feature selection. For example, if the extent of similarity between the first component and the second component is exceeding a threshold, then at least a few of the features of the second component may be reused while performing the feature selection of the first component. For example, a predictive model of coke strength after reaction (CSR) for second component uses features like coal quality (ash, volatile matter, moisture, fineness, coal fluidity and coal dilation) and process parameters (charging and pushing information, stamping time, bulk density, coking and soaking time, time to reach peak temperature, oven wall temperature and oxygen percentage), then same features could be used for first component as well while developing predictive model of CSR.

At step 212, the system 100 measures accuracy (of prediction) of an ANN data-driven model of the second component, for the features of the first component that are selected at step 210. The ANN data-driven model may be of the second component. Based on the determined accuracy, the system 100 verifies whether the existing ANN data-driven model can be reused as is, to form the digital twin of the first component. To determine this, at step 214, the system 100 compares the measured accuracy of the ANN data-driven model with a threshold of accuracy. If the measured accuracy is at least equal to the threshold of accuracy at step 216, then the system 100 may use the ANN data-driven model as a predictive data-driven model for the first component, at step 218, and in turn at step 222, the system 100 uses the predictive data-driven model to form a digital twin that can emulate working of the first component.

If at step 214 the system 100 determines that the measured accuracy of the ANN data-driven model is less than the threshold of accuracy, then the ANN data-driven model is retrained at step 220 to generate the predictive data-driven model for the first component. Steps in retraining the ANN data-driven model at step 220 are depicted in FIG. 3.

As depicted in FIG. 3, the system 100 may use different approaches to retrain the ANN data-driven model, based on the determined category of the first component. The ANN data-driven model includes a plurality of hidden layers. If the first component is in the first category, then at step 302 the system 100 trains only a last hidden layer of the plurality of hidden layers, with data of the first component. This is because initial layers of the ANN data-driven model learn higher level features and relationships themselves. Also, as the first component has smaller amount of data in the first category, only a limited number of the hidden layers can be retrained, so as to avoid overfitting. If the first component is in the second category, then at step 304 the system 100 trains a subset of the plurality of hidden layers with data of the first component, starting from the last hidden layer. As the first component is in the second category, there is more amount of data in comparison with the first category. So the system 100 uses the additional amount of data to train the subset of hidden layers.

If the first component is in the third category, then the first component has smaller amount of data in comparison with data of the second component. In this case, then at step 306 the system 100 trains a subset of the plurality of hidden layers with data of the first component, starting from the first hidden layer. This is because the initial layers in the ANN data-driven model contains high-level feature relationship. However, due to the dissimilarity (third category), the high-level features in the initial layers may not be relevant. Hence the subset of the plurality of hidden layers starting from the first hidden layer is trained, so as to make sure that the initial layers capture relevant high level features.

If the first component is in the fourth category, then the first component has larger amount of data in comparison with data of the second component. In this case, then at step 308 the system 100 trains all of the plurality of the hidden layers of the ANN data-driven model, with data of the first component. By (re)training all the hidden layers, the dissimilar data are replaced with relevant data at all layers of the ANN data-driven model.

After retraining the ANN data-driven model at step 220 every time, the system 100 measures accuracy of the ANN data-driven model and compares the measured accuracy with the threshold of accuracy. The process of (re)training the ANN data-driven model is repeated by the system 100 till the measured accuracy is at least equal to the threshold of accuracy, and then uses the resulting predictive data-driven model to emulate working of the first component.

This approach of reusing existing data facilitates generation of digital twins without having to extract the behavioral as well as operational data specific to the components every time.

In an alternate embodiment, if the system 100 is used to generate a non-ANN data-driven model, information of a pre-generated non-ANN data-driven model (of another component) is retrieved and reused. At this stage, the system 100 may directly reuse hyper-parameter values tuned while generating the non-ANN data-driven model of the other component or may retune it.

In various embodiments, the steps in method 200 may be performed in the same order as depicted in FIG. 2, or in any alternate order technically feasible.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of generating digital twin of a component by leveraging existing data and knowledge for a similar component. The embodiment thus provides a method and system for generating digital twin for an equipment or a process or a complete manufacturing plant by reusing data and knowledge from a digital twin generation process and resulting digital twin of a similar component. The digital twin of the component so developed will have the capacity to modify or enhance the performance of a process or an equipment or the plant in real-time, by providing instructions to the physical unit through the sensors and actuators installed on an equipment or in the plant. Similarly, it will also have the capability to change the condition or health of an equipment, based on the predictions of the ANN data-driven model, using the current as well as historical data.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of building a digital twin, the method comprising:
   determining an extent of similarity between a first component and a second component, via one or more hardware processors, wherein the first component is a component of a first industrial plant and the second component is a component having a similar operation as that of the first component;
   determining the first component as belonging to one of a first category, a second category, a third category, and a fourth category, based on the extent of similarity and amount of data associated with the first component, via the one or more hardware processors;

mapping each of a plurality of parameters of the first component with corresponding parameters of the second component, via the one or more hardware processors, wherein a combination of domain knowledge present in a repository, statistics and machine learning is used to process information on the parameters to understand range of operation, nature and effect on the process;

performing data integration for the first component, by using a data integration process used for the second component, via the one or more hardware processors;

performing feature selection for the first component, via the one or more hardware processors, wherein the feature selection is performed by considering multiple Key Performance Indicators (KPIs);

reusing the features of the second component while performing the feature selection of the first component when extent of similarity between the first component and the second component exceeds a threshold;

retraining an Artificial Neural Network (ANN) data driven model for the first component to generate a predictive data driven model, if a measured accuracy of the ANN data driven model for the first component is below a threshold of accuracy, till the measured accuracy is at least equal to the threshold of accuracy, via the one or more hardware processors, by:
- training a last hidden layer of a plurality of hidden layers of the ANN data driven model, if the first component belongs to the first category;
- training a subset comprising more than one of the hidden layers from the plurality of hidden layers, starting from the last hidden layer towards a first hidden layer, recursively till the measured accuracy is at least equal to the threshold of accuracy, if the first component belongs to the second category;
- training a subset of the plurality of hidden layers starting from the first hidden layer towards a last hidden layer, recursively till the measured accuracy is at least equal to the threshold of accuracy, if the first component belongs to the third category; and
- training all of the plurality of hidden layers of the ANN data driven model, if the first component belongs to the fourth category; and using the generated predictive model to emulate working of the first component, via the one or more hardware processors.

2. The method as claimed in claim 1, wherein the first component is determined as belonging to one of the first category, the second category, the third category, and the fourth category, comprising:
- comparing data of the first component with data of the second component to determine the extent of similarity between the data of the first component and the data of the second component;
- determining the first component as belonging to the first category if the extent of similarity exceeds a threshold of similarity and amount of data of the first component is small in comparison with the data of the second component;
- determining the first component as belonging to the second category if the extent of similarity exceeds the threshold of similarity and amount of data of the first component is large in comparison with the data of the second component;
- determining the first component as belonging to the third category if the extent of similarity is below the threshold of similarity and amount of data of the first component is small in comparison with the data of the second component; and
- determining the first component as belonging to the fourth category if the extent of similarity is below the threshold of similarity and amount of data of the first component is large in comparison with data of the second component.

3. A system for building a digital twin, the system comprising:
a memory storing instructions;
one or more communication interfaces; and
one or more hardware processors coupled to the memory via the one or more communication interfaces, wherein the one or more hardware processors are configured by the instructions to:

determine extent of similarity between a first component and a second component, wherein the first component is a component of a first industrial plant and the second component is a component having a similar operation as that of the first component;

determine the first component as belonging to one of a first category, a second category, a third category, and a fourth category, based on the extent of similarity and amount of data associated with the first component;

map each of a plurality of parameters of the first component with corresponding parameters of the second component, wherein a combination of domain knowledge present in a repository, statistics and machine learning is used to process information on the parameters to understand range of operation, nature and effect on the process;

perform data integration for the first component, by using a data integration process used for the second component;

perform feature selection for the first component, wherein the feature selection is performed by considering multiple Key Performance Indicators (KPIs);

reuse the features of the second component while performing the feature selection of the first component when extent of similarity between the first component and the second component exceeds a threshold;

retrain an Artificial Neural Network (ANN) data driven model for the first component to generate a predictive data driven model, if a measured accuracy of the ANN data driven model for the first component is below a threshold of accuracy, till the measured accuracy is at least equal to the threshold of accuracy, by:
- training a last hidden layer of a plurality of hidden layers of the ANN data driven model, if the first component belongs to the first category;
- training a subset comprising more than one of the hidden layers from the plurality of hidden layers, starting from the last hidden layer towards a first hidden layer, recursively till the measured accuracy is at least equal to the threshold of accuracy, if the first component belongs to the second category;
- training a subset of the plurality of hidden layers starting from the first hidden layer towards a last hidden layer, recursively till the measured accuracy is at least equal to the threshold of accuracy, if the first component belongs to the third category; and
- training all of the plurality of hidden layers of the ANN data driven model, if the first component belongs to the fourth category; and use the generated predictive model to emulate working of the first component.

4. The system a claimed in claim 3, wherein the system determines the first component as belonging to one of the first category, the second category, the third category, and the fourth category, by:
   comparing data of the first component with data of the second component to determine extent of similarity between the data of the first component and the data of the second component;
   determining the first component as belonging to the first category if the extent of similarity exceeds a threshold of similarity and amount of data of the first component is small in comparison with the data of the second component;
   determining the first component as belonging to the second category if the extent of similarity exceeds the threshold of similarity and amount of data of the first component is large in comparison with the data of the second component;
   determining the first component as belonging to the third category if the extent of similarity is below the threshold of similarity and amount of data of the first component is small in comparison with the data of the second component; and
   determining the first component as belonging to the fourth category if the extent of similarity is below the threshold of similarity and amount of data of the first component is large in comparison with the data of the second component.

5. One or more non-transitory machine-readable information storage mediums comprising one or more instructions which when executed by one or more hardware processors cause:
   determining extent of the similarity between a first component and a second component, via one or more hardware processors, wherein the first component is a component of a first industrial plant and the second component is a component having a similar operation as that of the first component;
   determining the first component as belonging to one of a first category, a second category, a third category, and a fourth category, based on the extent of similarity and amount of data associated with the first component, via the one or more hardware processors;
   mapping each of a plurality of parameters of the first component with corresponding parameters of the second component, via the one or more hardware processors, wherein a combination of domain knowledge present in a repository, statistics and machine learning is used to process information on the parameters to understand range of operation, nature and effect on the process;
   performing data integration for the first component, by using a data integration process used for the second component, via the one or more hardware processors;
   performing feature selection for the first component, via the one or more hardware processors, wherein the feature selection is performed by considering multiple Key Performance Indicators (KPIs);
   reusing the features of the second component while performing the feature selection of the first component when extent of similarity between the first component and the second component exceeds a threshold;
   retraining an Artificial Neural Network (ANN) data driven model for the first component to generate a predictive data driven model, if a measured accuracy of the ANN data driven model for the first component is below a threshold of accuracy, till the measured accuracy is at least equal to the threshold of accuracy, via the one or more hardware processors, by:
      training a last hidden layer of a plurality of hidden layers of the ANN data driven model, if the first component belongs to the first category;
      training a subset comprising more than one of the hidden layers from the plurality of hidden layers, starting from the last hidden layer towards a first hidden layer, recursively till the measured accuracy is at least equal to the threshold of accuracy, if the first component belongs to the second category;
   training a subset of the plurality of hidden layers starting from the first hidden layer towards a last hidden layer, recursively till the measured accuracy is at least equal to the threshold of accuracy, if the first component belongs to the third category; and
   training all of the plurality of hidden layers of the ANN data driven model, if the first component belongs to the fourth category; and
   using the generated predictive model to emulate working of the first component, via the one or more hardware processors.

6. The one or more non-transitory machine-readable information storage mediums of claim 5, wherein the first component is determined as belonging to one of the first category, the second category, the third category, and the fourth category, comprising:
   comparing data of the first component with data of the second component to determine extent of similarity between the data of the first component and the data of the second component;
   determining the first component as belonging to the first category if the extent of similarity exceeds a threshold of similarity and amount of data of the first component is small in comparison with the data of the second component;
   determining the first component as belonging to the second category if the extent of similarity exceeds the threshold of similarity and amount of data of the first component is large in comparison with the data of the second component;
   determining the first component as belonging to the third category if the extent of similarity is below the threshold of similarity and amount of data of the first component is small in comparison with the data of the second component; and
   determining the first component as belonging to the fourth category if the extent of similarity is below the threshold of similarity and amount of data of the first component is large in comparison with the data of the second component.

* * * * *